(No Model.) 2 Sheets—Sheet 1.
S. R. BAILEY.
CARRIAGE UNDERWORKS.
No. 511,833. Patented Jan. 2, 1894.
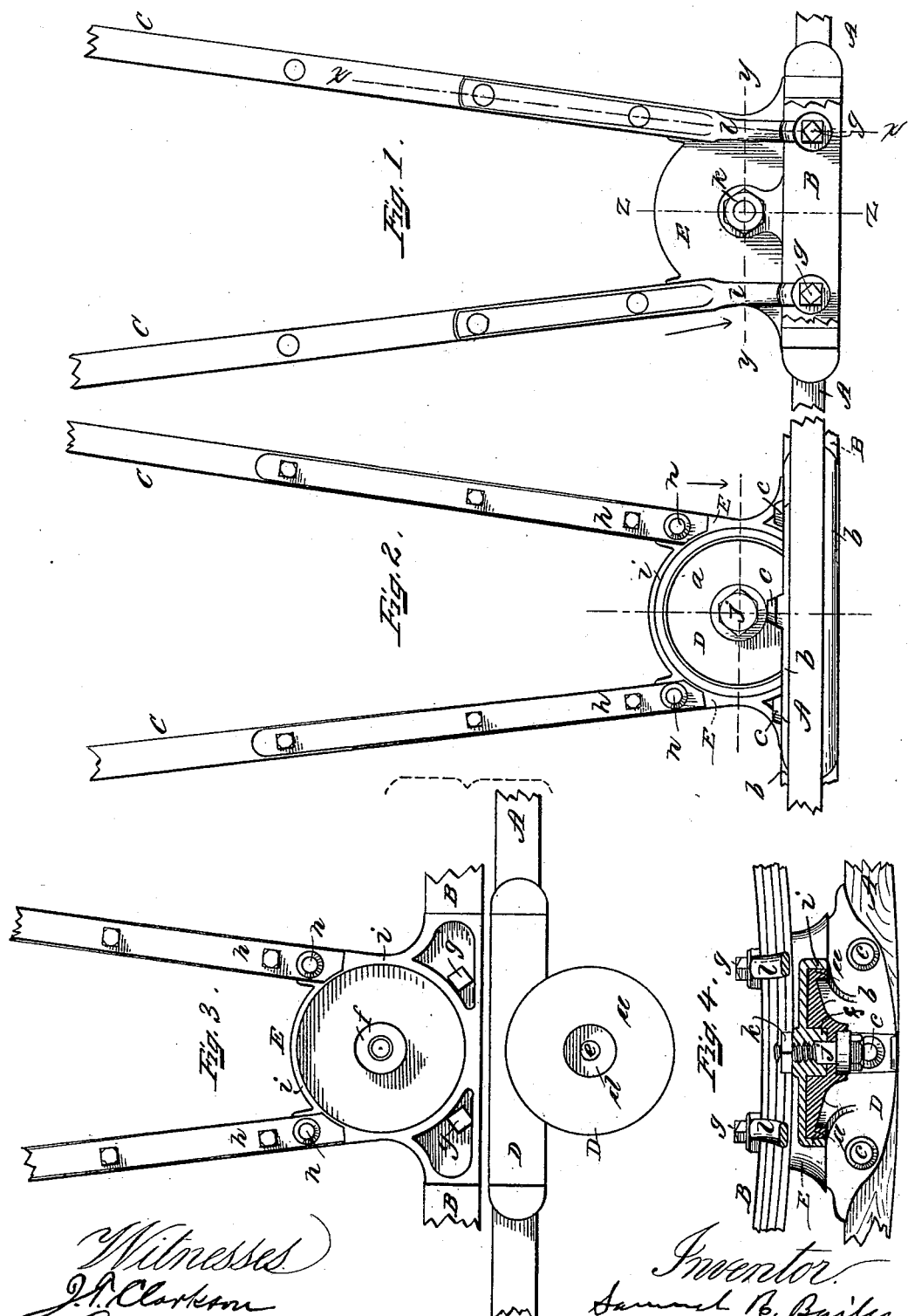

(No Model.) 2 Sheets—Sheet 2.
S. R. BAILEY.
CARRIAGE UNDERWORKS.
No. 511,833. Patented Jan. 2, 1894.

UNITED STATES PATENT OFFICE.

SAMUEL R. BAILEY, OF AMESBURY, MASSACHUSETTS.

CARRIAGE-UNDERWORKS.

SPECIFICATION forming part of Letters Patent No. 511,833, dated January 2, 1894.

Application filed October 8, 1892. Serial No. 448,213. (No model.)

*To all whom it may concern:*

Be it known that I, SAMUEL R. BAILEY, of Amesbury, in the county of Essex and State of Massachusetts, have invented a new and useful Improvement in Carriage-Underworks, which will, in connection with the accompanying drawings, be hereinafter fully described, and specifically defined in the appended claims.

Figure 5:
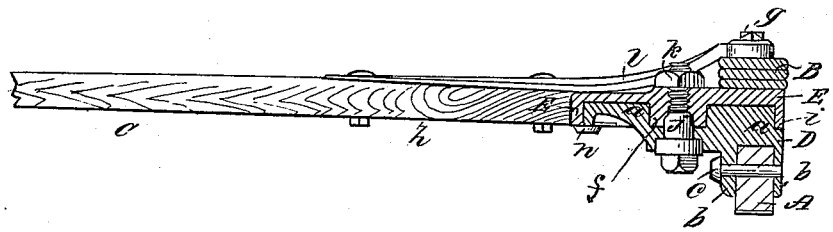
Figure 6:
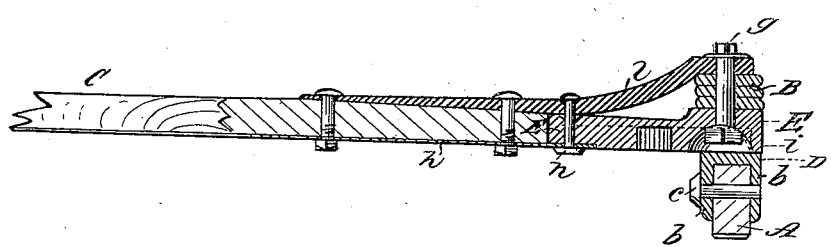
Figure 7:
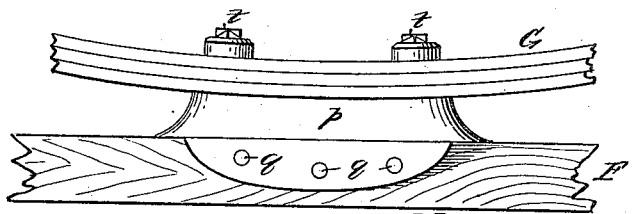
Figure 8:
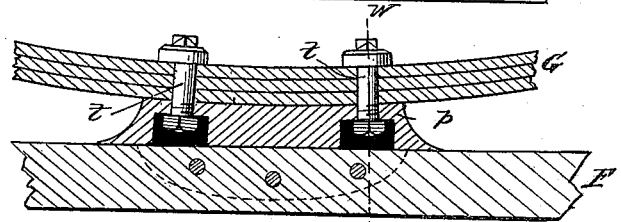
Figure 9:
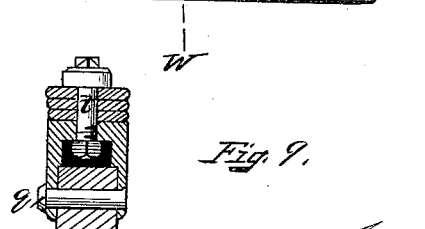

In said drawings, Figure 1 is a top plan view of the central portion of the forward axle, together with the central portion of the front spring of the carriage, the front part of the perches, and also a plan view of the coupling by which the rear under-work is connected with the forward under-work. Fig. 2 is an under side plan view of the parts shown in Fig. 1. Fig. 3 shows the two halves of the coupling in plan view, the lower half being detached from the upper half and turned upside down. Fig. 4 is a vertical section taken on line Y, Fig. 1, and as looking forward. Fig. 5 is a vertical section taken on line Z, Fig. 1, in the longitudinal line of the carriage. Fig. 6 is a vertical section taken on line X, Fig. 1. Fig. 7 is a rear elevation of the central portion of the rear axle and spring with my connection interposed between them. Fig. 8 is a longitudinal vertical section through Fig. 7. Fig. 9 is a transverse section as through Fig. 7 on line W.

The object of my invention is to provide a compact and secure means of connecting together the front axle, the front spring, and the perches, as also the rear axle and the rear spring. And these results I accomplish by means of connections which may be formed either of cast, or wrought metal, and which will be next herein described and then pointed out in the claims.

Referring again to the drawings, A represents the front axle, B the front spring, and C, C the "shear" perches. The half of the coupling that is attached to the front axle is shown at D, and as having formed integral with it the circular projection $a$, which has a circular central recess $d$ and a bolt hole $e$ central in said cavity. This lower half of the coupling is formed with flanges $b, b$, which embrace axle A, and which are secured thereto by rivets $c, c$, which pass through said flanges and the axle and are riveted in place. The upper half of the coupling is shown at E, and as formed to receive spring B to which it is secured by bolts $g$, and with seats to receive perches C and straps $h$, which are riveted to E and extend a certain distance along the under side of the perches. Said half E is formed with an external flange $i$ that incloses part $a$, and it is also formed with boss $f$, that fits into recess $d$, and with a central hole threaded to interlock with screw bolt $j$, which at top is provided with lock nut $k$. The bolts $g$ pass through the front portion of stays $l$ that are bolted on top of perches C, the rearward bolts in which also pass through straps $h$, which are riveted to coupling E by rivets $n$. By forming the center of D, E in rear of the axle A, a carriage can be turned in a smaller space, and by my method of constructing the various parts, a neat, compact and durable connection between the front and rear parts of the under-work is effected. The rear axle is shown at F, and $p$ is a metal block fitted to F, and secured in place by rivets $q$. The spring G is seated upon block $p$ and is thereto secured by bolts $t$, that have their heads seated in $p$ and pass upward through the springs as shown, so that there are no bolt holes in the axle, and only the small holes for rivets $q$.

It will be obvious that instead of riveting part D to axle A, it may be thereto clipped by clips that pass around its ends, or that are inserted in it by screw threads, or otherwise. And when used on axles having wood stocks it can be better secured by such clips. And instead of forming part E to receive the two perches C, it may be formed to receive one perch at a point midway between perches C.

I claim as my invention—

1. The coupling D, formed to extend in rear of the front axle so that the king bolt $j$ is also in rear of the axle; and also formed with flanges $b, b$, which receive the axle A between them, and with circular portion $a$ raised above the part that receives the axle, to receive part E of the coupling, substantially as specified.

2. In combination with axle F and spring G, the metallic block $p$ formed with flanges to embrace the axle, to which it is riveted, with a seat for the spring and with seats to receive bolts $t$, all substantially as specified.

SAMUEL R. BAILEY.

Witnesses:
L. W. HOWES,
T. W. PORTER.